June 23, 1936.  R. M. WOYTYCH  2,044,825
SPEED INDICATOR
Filed April 22, 1932
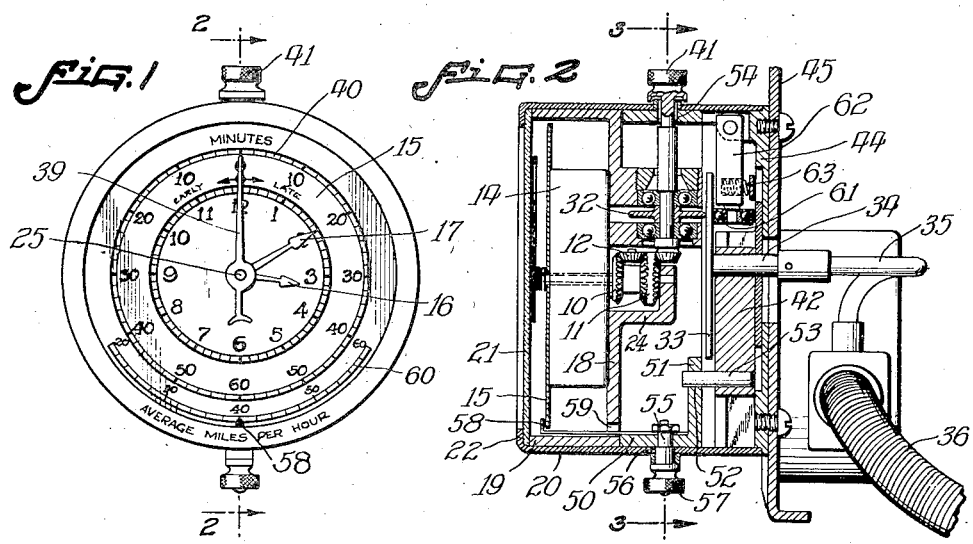
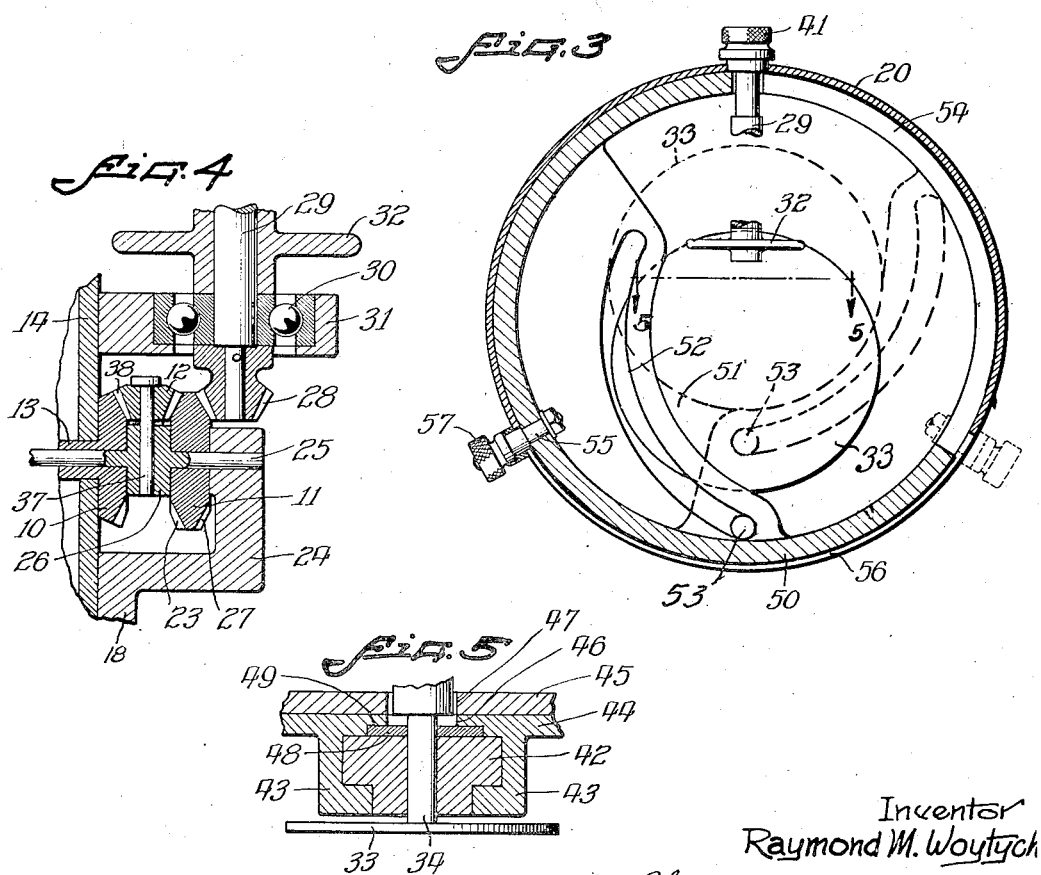
Inventor
Raymond M. Woytych
By Chindahl, Parker & Carlson
Attorneys Patented June 23, 1936

2,044,825

UNITED STATES PATENT OFFICE 2,044,825

SPEED INDICATOR

Raymond M. Woytych, Fond du Lac, Wis.

Application April 22, 1932, Serial No. 606,791

9 Claims. (Cl. 235—103.5)

The present invention relates generally to improvements in speed indicators, and has particular reference to a novel gauge for indicating the average speed of movable mechanical devices, and especially vehicles, water craft and aircraft.

An important object of the invention is to provide a new and improved indicator gauge which will show at a glance a comparison of the actual average speed that has been maintained at any given time relative to a predetermined average speed as a desired standard.

Other objects of the invention reside in the provision of a novel indicator gauge of the foregoing character which is adjustable at will to permit the selection of any desired average speed as the standard for comparison, and in which any departure of the actual average speed from the standard average speed is expressed in terms of time, and more specifically in terms of minutes at the standard average speed.

A general object is to provide a gauge for indicating the average speed of a moving unit which is simple and inexpensive in construction, and accurate and reliable in operation.

Further objects and advantages will become apparent as the description proceeds.

In the accompanying drawing, Figure 1 is a front elevational view of an indicator embodying the features of my invention.

Fig. 2 is a vertical axial sectional view of the indicator taken substantially along line 2—2 of Fig. 1.

Fig. 3 is an enlarged fragmentary vertical sectional view taken along line 3—3 of Fig. 2 but showing the indicator adjusted for a different average speed.

Fig. 4 is a fragmentary detail sectional view.

Fig. 5 is a fragmentary detail sectional view taken along line 5—5 of Fig. 3.

Referring more particularly to the drawing, the exemplary embodiment of the invention comprises a standard element 10 which is movable at a definite speed, a variable element 11 which is adapted to be driven by and in timed relation to the motion of a movable unit (not shown), and which when driven at the same speed as the element 10 represents travel of the unit at a desired predetermined speed, and a member 12 movable in accordance with any relative differential movement between the elements 10 and 11 for indicating the correlated departure at any time of the actual average speed of the unit from the desired average speed.

Although the invention is adapted for many different types of movable mechanical devices, such for example as water craft, aircraft, land vehicles and in some instances certain movable parts of stationary machines, it is particularly useful on automobiles, trucks and motor cycles, and hence the movable unit for which the gauge is provided is referred to hereinafter as being a vehicle.

For a given speed of the element 10, the average speed of the vehicle that is represented by movement of the element 11 at the same speed as the element 10 is determined by the drive ratio between the vehicle and the element 11. This ratio is subject to selective adjustment to vary the average speed of the vehicle that must be maintained in order to drive the elements 10 and 11 at the same speed, i. e. to adjust the predetermined average speed that is to be used as a standard.

The element 10 preferably is in the form of a bevel gear fixed on one end of a hollow shaft 13 which is adapted to be driven at a constant predetermined speed, and which in the present instance constitutes the outlet shaft of a suitable timing device or clock 14 having a circular dial 15 and hour and minute hands 16 and 17. The clock 14 is mounted on the rear end wall 18 of a circular inner casing 19 which is open at the front to expose the dial 15, and which is secured in the front end of a circular outer casing or shell 20. A suitable glass 21 is peripherally secured between the front edge of the inner casing 19 and an inner peripheral flange 22 on the front end of the outer casing 20.

The element 11 comprises a bevel gear 23 which is opposed to and axially spaced from the gear 10, and which with the gear 10 is enclosed in a housing 24 formed in the wall 18. The gear 23 is freely rotatable on a shaft 25 journaled at one end in the inner end wall of the housing 24 and extending at the other end axially through the gear 10 and the shaft 13. A circular enlargement 26 on the shaft 25 constitutes a spacer between the two opposed gears 10 and 23.

The drive connection between the vehicle and element 11 comprises a bevel gear 27 rigid with the back of the gear 23 and meshing with a bevel pinion 28 fixed on a vertical shaft 29. The latter is journaled in ball bearings 30 mounted in two spaced lugs 31 on the rear of the wall 18. A friction disk 32 is fixed on the shaft 29 between the lugs 31, and engages at its periphery eccentrically with the face of a second friction disk 33 rotatable at right angles thereto. The disk 33 has a shaft 34 connected to a flexible shaft 35 which leads through a flexible conduit 36 to a suitable speed reduction connection (not shown) operable by and in definite timed relation to the motion of the vehicle. Approximately one twenty-third (1/23) of a revolution of the disk 33 per mile of travel of the vehicle represents a suitable speed ratio for many purposes.

The elements 10 and 11 are rotatable in opposite directions. Thus, as viewed from the left of Fig. 4, the element 10 is always rotated in a clockwise direction, and the element 11 is always rotated in a counterclockwise direction during the forward travel of the vehicle. Pivotally mounted on a pin 37 on the spacer 26 is the member 12 which is formed on its periphery with gear teeth constituting a bevel pinion 38 meshing with the opposed gears 10 and 23. Hence, the adjacent side faces of the elements 10 and 11 are in driving engagement with the member 12.

The gears 10, 23 and 38 constitute a differential mechanism adapted to drive the shaft 25 in accordance with differences in speed between the gears 10 and 23. Thus, if the gear 23 is rotated at the same speed as the gear 10 and in the opposite direction, the pinion 38 will just rotate but will not turn the shaft 25. However, if the gear 23 is rotated at a slower speed than the gear 10, the pinion 38 will roll on the gear 23 in the direction in which the gear 10 is rotated to turn the shaft 25 in the same direction, i. e. clockwise as viewed in Fig. 1. Conversely, if the gear 23 is rotated at a faster speed than the gear 10, the pinion will roll on the gear 10 in the direction in which the gear 23 is rotated to turn the shaft 25 in the same direction, i. e. counterclockwise. Starting from an initial or zero position, the degree of rotation of the shaft 25 to the right or left represents the aggregate departure at any time, above or below as the case may be, from the mileage that would be made at the standard average speed.

To indicate the position of the shaft 25, a pointer 39 is mounted on the front end and is movable over the dial 15. Provided on the dial 15 is a suitable scale 40 divided into convenient units calibrated to the movement of the pointer 39. In the present instance, the scale 40 indicates the departure from the desired average speed in terms of time, as for example minutes late or early.

To afford means for adjusting the pointer 39, independently of the drive from the vehicle, say for example into the zero position at the start of a trip, the shaft 29 is extended upwardly through the wall of the casing 20 and is provided on its outer end with an adjusting knob 41.

The disks 32 and 33 are relatively adjustable radially of the latter to vary the speed ratio between the gear element 11 and the inlet shaft 34 for the purpose of adjusting the average speed requirements. To this end, the shaft 34 is journaled in a slide 42 (see Figs. 2 and 5) which is secured for vertical movement between two parallel guides 43 formed in a plate 44 closing the rear end of the casing 20. To mount the gauge for inspection, the plate 44 may be secured to any convenient support, such for example as the dashboard 45 of an automobile, truck or bus. Two vertical registering slots 46 and 47 are formed respectively in the plate 44 and the board 45 to accommodate vertical adjustment of the shaft 34. A shield 48 slidable in a recess 49 in the plate 44 and movable with the shaft 34 serves to seal the slots 46 and 47 against the entry of foreign matter into the casing 20 in all positions of adjustment of the slide 42.

The means for adjusting the slide 42 preferably comprises a ring 50 which is rotatably mounted in the casing 20 against the back of the wall 18, and which has an inner cam 51. To provide a positive action in both directions of adjustment of the slide 42, the cam 51 is formed with an inclined arcuate slot 52 which extends gradually inwardly from the periphery toward the center of the ring 50, and which receives a pin 53 extending forwardly from the slide. A peripheral slot 54 formed in the ring 50 slidably embraces opposite sides of the outward extension of the shaft 29. A pin 55 secured to the ring 50 extends outwardly through a peripheral slot 56 in the casing 20, and has a hand knob 57 on the outer end.

It will be evident that rotation of the ring 50 will adjust the slide 42 to vary the speed ratio between the disks 32 and 33. To indicate the speed ratio adjustment, a pointer 58 is secured to the ring 50 and extends forwardly through an opening 59 in the wall 18 to the front of the dial 15. An arcuate scale 60 is provided on the dial 15 in operative relation to the pointer 58, and may be divided into any suitable units properly calibrated to indicate the average miles per hour that should be maintained by the vehicle for different positions of adjustment of the cam ring 50 and the parts controlled thereby in order to keep the pointer 39 at zero. In Fig. 3 the ring 50 and the parts controlled thereby are shown in full outline in the positions they occupy when adjusted for a twenty mile average, and are shown in dotted outline in the positions they occupy when adjusted for a sixty mile average.

A roller 61 mounted on the lower end of a depending pivotal arm 62 is urged by a spring 63 into engagement with the disk 33 to hold the latter in good driving contact with the disk 32.

I claim as my invention:

1. A speed indicator for a movable vehicle comprising, in combination, a standard element rotatable in one direction at a constant predetermined speed and having a side face, a second element having a side face in opposed relation to said first mentioned face and being rotatable in the opposite direction, means including a flexible inlet shaft and a speed-change device for driving said second element in timed relation to the motion of the vehicle, means for indicating the adjustment of said device, a movable support, a member rotatable on said support and peripherally in driven engagement with said faces, and means for indicating the position of said support.

2. A speed indicator for a movable unit comprising, in combination, a bevel gear having a shaft, a time device for rotating said shaft in one direction at a constant speed, a second bevel gear opposed to and coaxial with said first mentioned bevel gear, means including a speed-change device for driving said second bevel gear in the opposite direction in timed relation to the motion of the unit, a rotatable support between said gears, said support having a shaft extending axially through said first mentioned shaft, a bevel pinion rotatable on said support and meshing with said gears, a dial on said time device having two scales, a pointer fixed on said last mentioned shaft and movable over one of said scales, and means movable over the other of said scales to indicate the adjustment of said speed-change device.

3. A speed indicator for a movable vehicle comprising, in combination, a bevel gear rotatable at a constant speed, a second bevel gear opposed to and coaxial with said first mentioned bevel gear, a flexible inlet shaft driven by the vehicle, means connected to said shaft and including a speed-change device for driving said second bevel gear in timed relation to the motion of the unit, means for indicating the adjustment of said speed-change device, a rotatable support coaxial with said gears, a bevel pinion rotatable on said support and meshing with said gears, and means for indicating the degree of rotation of said support.

4. A speed indicator for a movable unit comprising, in combination, a casing, a wall in said casing, said wall being formed with a differential housing, a clock mounted on said wall, said clock having a dial and an outlet shaft, a gear mounted on said shaft in said housing, an opposed gear in said housing, a member rotatable about the axis of said gears, a gear pinion rotatably mounted on said member and meshing with said gears, means for indicating the degree of rotation of said member, and means including a change-speed device for driving said opposed gear in timed relation to the movement of said unit.

5. A speed indicator for a movable unit comprising, in combination, a standard element rotatable in one direction at a constant predetermined speed, a second element in opposed relation to said first mentioned element and being rotatable in the opposite direction, a pivotal support, a member rotatable on said support and peripherally in driven engagement with said elements, means for indicating the pivotal position of said support, a shaft for driving said second element, a friction disk on said shaft, a second friction disk having one face in engagement with the first mentioned friction disk, means for driving said second disk in timed relation to the motion of the unit, a slide for supporting said second friction disk, guides extending parallel to the plane of said second friction disk for supporting said slide, a rotary cam ring, said cam ring having an inwardly inclined curved slot, a pin on said slide engaging in said slot, and means for indicating the position of adjustment of said ring.

6. A speed indicator for a movable unit comprising, in combination, a standard element rotatable in one direction at a constant predetermined speed, a second element in opposed relation to said first mentioned element and being rotatable in the opposite direction, a pivotal support, a member rotatable on said support and peripherally in driven engagement with said elements, means for indicating the pivotal position of said support, a shaft for driving said second element, a friction disk on said shaft, a second friction disk having one face in engagement with the first mentioned friction disk, means for driving said second disk in timed relation to the motion of the unit, a support for said second friction disk, and means for adjusting said support to adjust the engagement between said disks.

7. A speed indicator for a movable unit comprising, in combination, a standard element rotatable in one direction at a constant predetermined speed, a second element in opposed relation to said first mentioned element and being rotatable in the opposite direction, a pivotal support, a member rotatable on said support and peripherally in driven engagement with said elements, means for indicating the pivotal position of said support, a shaft for driving said second element, a friction disk on said shaft, a second friction disk having one face in engagement with the first mentioned friction disk, means for driving said second disk in timed relation to the motion of the unit, an adjustable support for said second friction disk, a rotatable cam for adjusting said support, and means for indicating the position of said cam.

8. A speed indicator for a vehicle comprising, in combination, a bevel gear having a shaft, a time device for rotating said shaft in one direction at a constant speed, said device having a dial, an indicator secured to said shaft for movement over said dial, a second bevel gear opposed to and coaxial with said first mentioned bevel gear, means including a speed-change device for driving said second bevel gear in the opposite direction in timed relation to the motion of said vehicle, means coacting with said dial for indicating the adjustment of said device, a rotatable support between said gears, said support having a shaft extending axially through said first mentioned shaft, an indicator secured to said last mentioned shaft for movement over said dial, and a bevel pinion rotatable in said support and meshing with said gears.

9. A speed indicator for a movable unit comprising, in combination, a standard rotatable element, means operable to drive said element continuously at a constant speed, a second rotatable element adapted to be driven by the motion of the unit and in timed relation thereto, said elements being mounted in coaxially spaced relation, means adjustable at will for varying the timed relation between said second element and said unit, an indicator connected to said last mentioned means to indicate the adjustment thereof, a member independent of said first mentioned means and disposed between and in driving engagement with said elements, said member being mounted to rotate about an axis perpendicular to the axes of said elements and to revolve about said axes, and an indicator connected to said member to indicate the degree of revolution thereof.

RAYMOND M. WOYTYCH.